United States Patent
Loughry

(10) Patent No.: US 9,311,721 B1
(45) Date of Patent: Apr. 12, 2016

(54) GRAPHICS PROCESSING UNIT-ASSISTED LOSSLESS DECOMPRESSION

(71) Applicant: Sandia Corporation, Albuquerque, NM (US)

(72) Inventor: Thomas A. Loughry, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 254 days.

(21) Appl. No.: 14/067,788

(22) Filed: Oct. 30, 2013

Related U.S. Application Data

(60) Provisional application No. 61/808,362, filed on Apr. 4, 2013.

(51) Int. Cl.
*G06T 9/00* (2006.01)
*G06T 1/20* (2006.01)

(52) U.S. Cl.
CPC .... *G06T 9/00* (2013.01); *G06T 1/20* (2013.01)

(58) Field of Classification Search
CPC ..... H04N 19/91; H04N 19/136; H04N 19/44; G06T 9/00; G09G 2340/02; G09G 5/363
See application file for complete search history.

(56) References Cited

U.S. PATENT DOCUMENTS

| | | | |
|---|---|---|---|
| 7,424,163 B1 | 9/2008 | Ellis et al. | |
| 8,311,352 B2 | 11/2012 | Nishikawa et al. | |
| 8,488,893 B2 | 7/2013 | Itoh | |
| 8,631,055 B2 * | 1/2014 | Wegener | H03M 7/3059 708/203 |
| 2006/0115164 A1 * | 6/2006 | Cooley | H04N 19/593 382/232 |
| 2010/0135418 A1 * | 6/2010 | Zhang | H04N 19/44 375/240.25 |
| 2012/0121198 A1 | 5/2012 | Liao et al. | |
| 2012/0195511 A1 | 8/2012 | Park et al. | |
| 2012/0229664 A1 | 9/2012 | Solomon | |
| 2012/0294542 A1 | 11/2012 | Lee et al. | |
| 2012/0301040 A1 * | 11/2012 | Yie | H04N 19/176 382/233 |
| 2013/0021350 A1 * | 1/2013 | Schmit | H04N 19/436 345/506 |
| 2013/0136188 A1 | 5/2013 | Kumar et al. | |
| 2013/0144850 A1 | 6/2013 | Dykeman et al. | |
| 2013/0148745 A1 | 6/2013 | Agarwal et al. | |

* cited by examiner

*Primary Examiner* — Hau Nguyen
(74) *Attorney, Agent, or Firm* — Michael A. Beckett

(57) ABSTRACT

Systems and methods for decompressing compressed data that has been compressed by way of a lossless compression algorithm are described herein. In a general embodiment, a graphics processing unit (GPU) is programmed to receive compressed data packets and decompress such packets in parallel. The compressed data packets are compressed representations of an image, and the lossless compression algorithm is a Rice compression algorithm.

8 Claims, 7 Drawing Sheets

GRAPHICS PROCESSING UNIT-ASSISTED LOSSLESS DECOMPRESSION

RELATED APPLICATION

This application claims priority to U.S. Provisional Patent Application No. 61/808,362, filed on Apr. 4, 2013, and entitled "GPU ACCELERATED RICE DECOMPRESSION," the entirety of which is incorporated herein by reference.

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Data compression involves encoding data using fewer elements than present in uncompressed (original) data. Lossless data compression exploits statistical redundancies such that no portions of the original data are lost when the original data is compressed, which is in contrast to lossy compression, where portions of the original data are lost during compression. Lossless compression thus allows for creation of compressed data, where the exact original data can be reconstructed from the compressed data.

The ratio between uncompressed data size and compressed data size is referred to as the compression rate. As the compression rate corresponding to the data increases, an amount of information represented by compressed data likewise increases. Accordingly, more information can be retained in a given amount of memory storage or transmitted over a communications channel with a given transmission bandwidth as the compression rate increases. Generally, however, information represented by compressed data is inaccessible until the compressed data is decompressed, and as a compression rate increases, time required to decompress the data likewise increases.

In applications where compressed data is being continuously received, it may be desirable to be able to use and/or view information represented thereby as the data is received. For example, rather than decompressing an entire video file before viewing it, if individual frames can be decompressed as fast as the rate at which the frames are displayed, the video can be viewed without interruption, while compressed data is received. In such a case, however, resolution of the video is limited by a transmission capacity of a transmission channel over which the video is received, and further limited by resources needed to decompress the data in real-time. For example, with respect to video received from a satellite, the satellite may have a broadcast bandwidth limit of, for instance, 10 MB/sec. In order to pack more information into a transmission, a higher compression rate can be used, so long as the transmission can be decompressed as fast as it is received. For example, with respect to compressed data having a 3:1 compression ratio, decompressing one second of video (e.g., 10 MB of data) received over the transmission channel to 30 MB of uncompressed data may take more than the one second (e.g., the compressed data is received more quickly than it can be decompressed).

The decompression rate is determined by the algorithm used to compress data as well as capabilities of a system that decompresses the data. Application Specific Integrated Circuits (ASICs) specially designed to decompress a specific type of encoding (compression) have been shown to achieve decompression rates of about 80 MB/sec. Software implemented solutions that exploit improvements in central processing unit (CPU) processing power have achieved decompression rates as high as 150 MB/sec. For various applications, however, higher decompression rates are desirable.

SUMMARY

The following is a brief summary of subject matter that is described in greater detail herein. This summary is not intended to be limiting as to the scope of the claims.

Described herein are various technologies pertaining to decompressing data through utilization of a graphics processing unit (GPU). Data to be decompressed is accumulated at a system memory in "chunks," wherein a chunk refers to a predetermined number of compressed data packets. A chunk is transferred to an onboard memory of a GPU, and the GPU executes at least one kernel to decompress the chunk. For instance, a first kernel can be composed of at least one thread, and instances of the at least one thread can be executed over respective compressed data packets in parallel, thereby decompressing the compressed data packets (creating decompressed data packets).

Each decompressed data packet can include a respective plurality of data elements (e.g., pixels), which were de-correlated and mapped to symbols during compression. The GPU can further be programmed to execute a second kernel that is configured to de-map and correlate each decompressed data packet in the chunk, one at a time. More specifically, the second kernel can be composed of at least one thread, and instances of the at least one thread can be executed over respective data elements in a decompressed data packet in parallel. The instances of the at least one thread can be executed over each decompressed data packet (e.g., in an order corresponding to a predefined sequence of the decompressed data packets). This results in the data elements being de-mapped and correlated, thus creating de-mapped, de-correlated data packets (referred to as de-mapped data packets). The de-mapped data packets are equivalent to original data packets, prior to compression. The GPU can further execute a third kernel that is configured to compute respective checksums for de-mapped data packets. The third kernel is composed of at least one thread, and instances of the at least one thread can be executed over respective de-mapped data packets in parallel, thus producing checksums for the respective de-mapped data packets in parallel. Such checksums can be used to verify that the respective plurality of de-mapped data packets matches the original data packets (prior to being compressed).

While chunks are being transferred to or from the onboard memory of the GPU and system memory, the threads of the GPU may be idle. To reduce such idleness, a central processing unit (CPU) can execute portions of code that control transfer of data from system memory to the onboard memory of the GPU, and further control when the GPU compresses a chunk. Additionally, it is to be understood that multiple GPUs can be used to increase the decompression rate.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or

DETAILED DESCRIPTION

Figure 1:
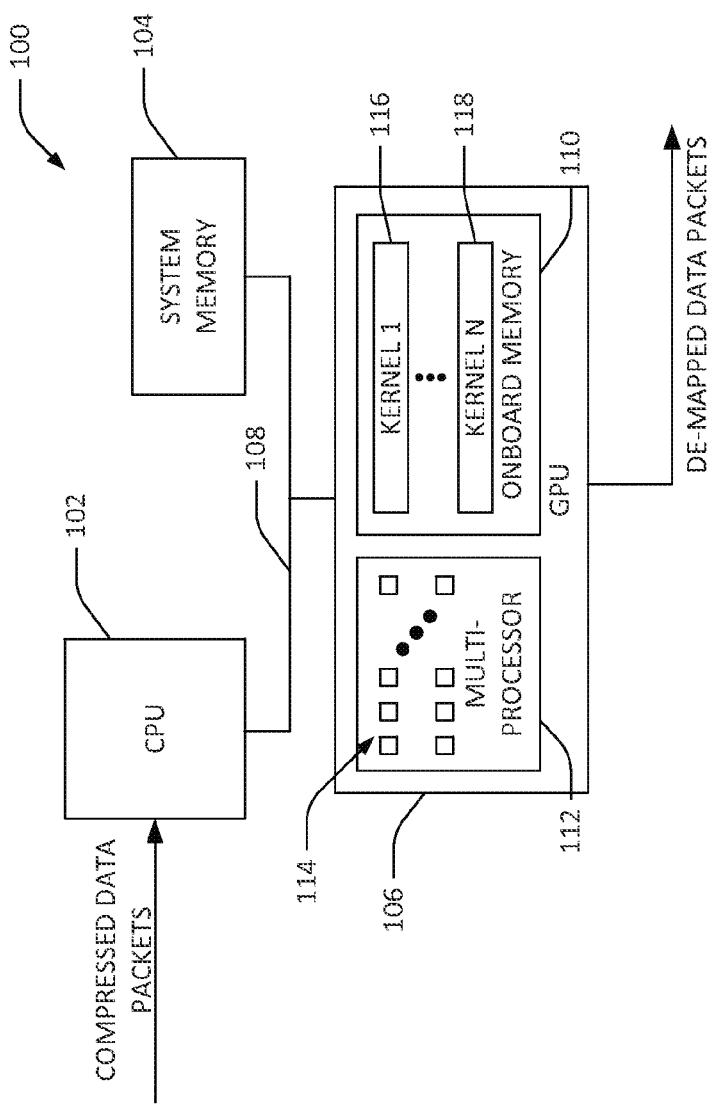
FIG. 1 is a functional block diagram of an exemplary system that facilitates decompressing data through utilization of a graphics processing unit (GPU).

Various technologies pertaining to lossless data decompression through use of a graphics processing unit are now described with reference to the drawings, wherein like reference numerals are used to refer to like elements throughout. In the following description, for purposes of explanation, numerous specific details are set forth in order to provide a thorough understanding of one or more aspects described herein. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The articles "a," "an," and "the" should be interpreted to mean "one or more" unless the context clearly indicates the contrary. The term "includes" is used interchangeably with the term "comprising." Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass 1) computer-readable data storage that is configured with computer-executable instructions that cause certain functionality to be performed when executed by a processor; and/or 2) a hardware circuit configured to cause certain functionality to be performed. Computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

A graphics processing unit (GPU) is a many-cored processing unit, has a highly parallel structure, and can generally outperform general purpose central processing units (CPUs) when large blocks of data can be processed in parallel. Many processes, however, are not inherently parallelizable, such as when elements of data are interdependent (e.g., one data element is dependent on another). In such processes, data elements are received serially, and an order in which the data elements are to be processed is a function of the order in which the data elements are received. Compression algorithms conventionally utilized for compressing streaming data, such as lossless compression algorithms utilized for compressing streaming audio and/or video, are generally not inherently parallelizable, and thus are not readily adapted to exploit the parallel structure of a GPU. Aspects described herein pertain to technologies for exploiting the parallel processing capabilities of GPUs when decompressing data compressed by way of a lossless compression algorithm, which is an inherently serial process.

With reference to FIG. 1, an exemplary system 100 that facilitates decompressing data through utilization of a GPU is illustrated. The system 100 includes a CPU 102, a system memory 104, and a GPU 106, wherein the CPU 102 and the GPU 106 can communicate with one another and access the system memory 104 by way of a system bus 108. The system memory 104 can be random access memory (RAM), a hard disk, or other suitable computer-readable storage media. The system memory 104 comprises executable instructions, and the CPU 102 executes such instructions. Additionally, the CPU 102 can initialize the GPU 106, wherein initializing the GPU comprises, for example, requesting that the GPU 106 perform a particular task, allocating memory space for the GPU 106 in the system memory 104, setting initial behavior flags for the GPU 106, etc. Initialization of the GPU 106 prepares the GPU 106 for operations described below, and is thus generally performed, for example, on system startup or responsive to the CPU 102 receiving an indication that a data decompression algorithm is to be executed over data by the GPU 106.

The GPU 106 comprises an onboard memory 110, which can be or include Flash memory, RAM, etc. In an exemplary embodiment, the GPU 106 can receive data retained in the system memory 104, and such data can be retained in the onboard memory 110 of the GPU 106. The GPU 106 further includes at least one multi-processor 112, wherein the multi-processor 112 comprises a plurality of stream processors (referred to herein as cores 114). Generally, GPUs comprise several multi-processors, with each multi-processor comprising a respective plurality of cores. A core executes a sequential thread, wherein cores of a particular multi-processor execute the same sequential thread in parallel.

The onboard memory 110 can further comprise a plurality of kernels 116-118. In general, the GPU 106 can be programmed as a sequence of kernels, where typically one kernel completes execution before the next kernel begins. In the system 100, the kernels 116-118 are programmed to decompress and decode compressed, encoded data packets, where the data packets are compressed and encoded by way of a lossless compression algorithm. Generally, each kernel in the plurality of kernels 116-118 is respectively organized as a hierarchy of threads, wherein (as noted above) a core can execute a thread. The GPU 106 groups threads into "blocks", and further groups blocks into "grids." A multi-processor of the GPU 106 executes threads in a block (e.g., threads in a block are generally not distributed across multi-processors of the GPU 106). A multi-processor, however, may concurrently execute threads in different blocks. Thus, threads in a single block can be assigned to different multi-processors concurrently, to the same multi-processor concurrently (using multithreading), or may be assigned to the same or different multi-processors at different times.

As noted above, the system 100 is configured to decompress and decode data packets that have been compressed and encoded using a lossless compression algorithm. As used herein, decompressing and decoding are collectively referred to as decompressing, while compressing and encoding may be collectively referred to as compressing. An exemplary lossless compression algorithm is the Rice compression algorithm, although other lossless compression algorithms are contemplated, such as those associated with acronyms JPG, TIFF, GIF, TARR, RAW, BMP, MPEG, MP3, OGG, AAC, ZIP, PNG, DEFLATE, LZMA, LZO, FLAC, MLP, RSA, etc.

In operation, the CPU 102 receives a stream of compressed data packets (e.g., data packets that have been compressed and encoded through use of a lossless compression algorithm). In an exemplary embodiment, a satellite can be configured to continuously generate a stream of compressed image data packets (e.g., in a particular sequence), which are received by the CPU 102 (e.g., by way of an antenna). Pursuant to an example, the satellite can have hardware (e.g., an application specific integrated circuit (ASIC)) thereon that is configured to execute a lossless compression algorithm over image data (pixels) generated at the satellite. For instance, the Consultive Committee for Space Data Systems, Lossless Data Compression, Green Book, CCSDS 120.0-G-2, the entirety of which is incorporated herein by reference, describes hardware configured to perform Rice compression over image data generated at the satellite.

For purposes of explanation, compression of image data by way of a Rice compression algorithm is generally described. It is to be understood that the hereto-appended claims are not intended to be limited to image data or Rice compression/decompression unless explicitly recited in such claims. In an exemplary embodiment, when original image data is compressed by way of a Rice compression algorithm, the image data is segmented into a plurality of image packets, with each image packet comprising data for a threshold number of pixels (e.g., 4,096 pixels). The first step in compressing an image packet is to de-correlate the pixel data and map such data into symbols for entropy encoding, creating mapped data blocks. Each mapped data block can correspond to 16 pixels (e.g., a 4×4 pixel image). Exemplary correlation/de-correlation techniques include unit delay de-correlation (e.g., "Nearest Neighbor") and external predictor de-correlation (e.g., "Previous Frame"). Each mapped data block can thereafter be compressed using many different possible approaches, and the approach that achieves the greatest compression for a respective mapped data block is selected. Thus, continuing with the image example, an uncompressed data packet can include 4,096, 15 bit pixels (corresponding to a 64×64 pixel image). Compression by way of Rice encoding can result in creation of 256 compressed blocks (each block corresponding to a 4×4 pixel image) that are concatenated to form a compressed data packet. Each compressed block in the compressed data packet comprises an identifier (ID) that identifies the compression method to compress a respective block. It can be ascertained that since there is no way to know, without sequentially decompressing the packet, how many bits each block of 16 pixels compressed to, decompression of a single data packet cannot be performed in parallel. Instead, compressed blocks must be decompressed one at a time, in order, so that the ID of the next compressed block can be located in the bit pattern.

Rather than decompressing (e.g., decompressing and decoding) each compressed data packet as a respective data packet is received (e.g., as is done in conventional ASIC or CPU-based approaches), the CPU 102 causes compressed data packets to be accumulated in the system memory 104. The CPU 102 transmits a command signal to the GPU 106 when the system memory 104 comprises a threshold number of compressed data packets. The GPU 106, responsive to receipt of the command signal from the CPU 102, retrieves a "chunk" of encoded packets from the system memory 104. In an exemplary embodiment, each chunk comprises a threshold number of compressed data packets, wherein the threshold number of compressed packets included in a chunk can be based upon, for example, which kernel in the plurality of kernels 116-118 is being executed by the GPU 106, a number of threads in a kernel being executed by the GPU 106, a desired latency of decompression, a number of pixels per uncompressed image, etc. Generally, the number of compressed data packets in a chunk is less than or equal to a number of cores of the GPU that can execute threads corresponding to the chunk, such that an entire chunk can be processed at once by the GPU 106. Accordingly, decompression latency can be on the order of milliseconds or less, allowing for a stream of compressed data packets to be decompressed in an uninterrupted fashion.

As noted above, the onboard memory 110 of the GPU 106 can comprise a plurality of kernels 116-118 that are programmed to decompress the encoded data packets, thereby recreating original data (e.g., recreating an original image). For instance, the plurality of kernels 116-118 can comprise a first kernel 116 that, when executed by the GPU 106, decompresses compressed data packets in a chunk, thereby forming a plurality of decompressed data packets. The plurality of kernels 116-118 can also include a second kernel that de-maps and correlates data elements in each decompressed data packet, thereby forming a plurality of de-mapped and de-correlated data packets (referred to as de-mapped data packets). The plurality of kernels 116-118 can further include a third kernel that, when executed by the GPU 106, computes respective checksums for the de-mapped data packets and appends the respective checksums to the de-mapped data packets. Therefore, in an example, the GPU 106 can load a chunk of compressed data packets into the onboard memory 110, thereafter execute the first kernel 116, the second kernel, and the third kernel in sequence, and can transmit resultant de-mapped data packets to the system memory 104 (or other suitable storage media). Such process repeats for numerous chunks, and can continue for as long as the CPU 102 receives compressed data packets.

By exploiting the parallel structure of the GPU, compressed data packets can be decompressed at a rate above 300 MB/sec. In an example, the rate can be between 300 MB/sec. and 1,000 MB/sec. In another example, the rate can be between 1,000 MB/sec. and 3,000 MB/sec. It can be ascertained that as the performance of GPUs rises, the decompression rate achievable by the system 100 is also expected to rise.

Figure 2:
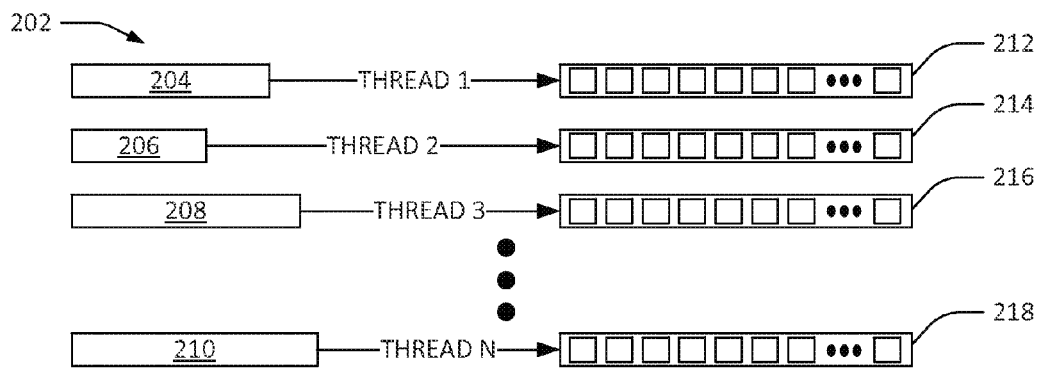
FIG. 2 is an exemplary illustration of a first kernel of a GPU executing over a plurality of compressed data packets.
Figure 3:
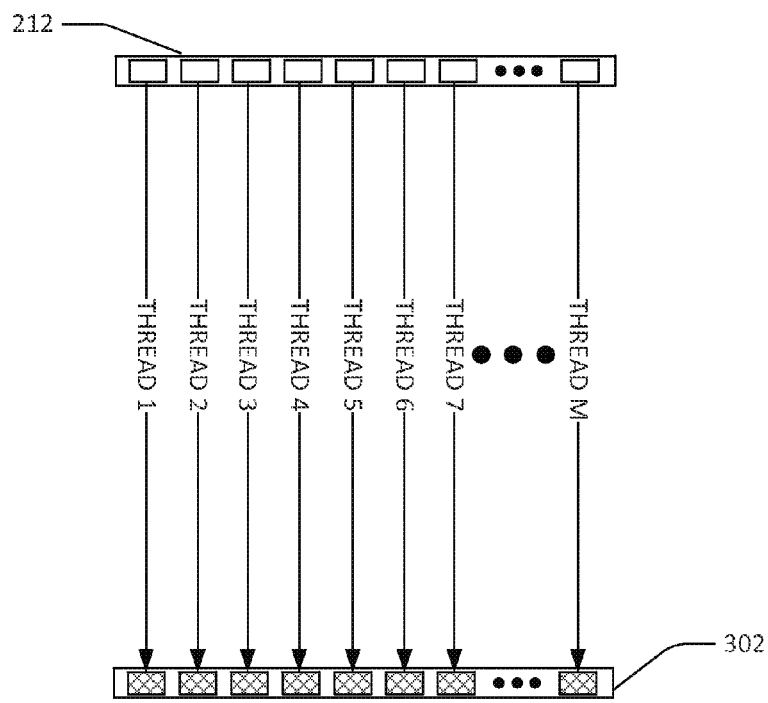
FIG. 3 is an exemplary illustration of a second kernel of a GPU executing over a plurality of decompressed data packets.
Figure 4:
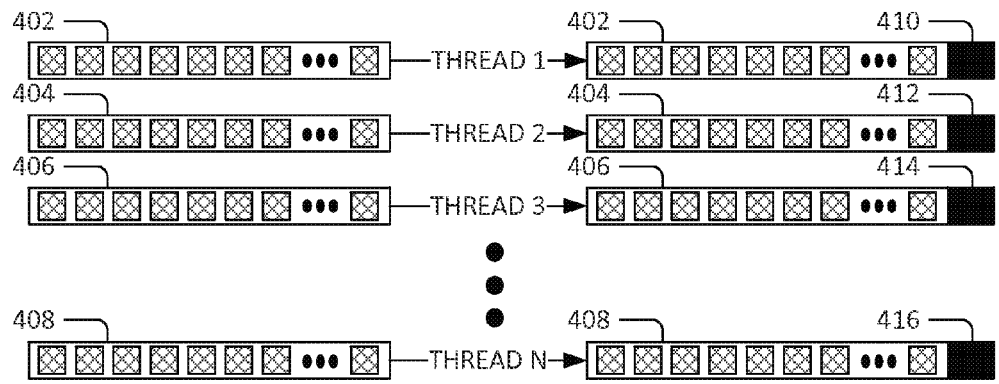
FIG. 4 is an exemplary illustration of a third kernel of a GPU executing over a plurality of de-mapped data packets.

With reference to FIGS. 2-4, illustrations pertaining to decompression of compressed data packets are set forth. FIG. 2 illustrates execution of the first kernel 116 by the GPU 106 over a chunk 202 of N compressed data packets 204-210, thereby producing a plurality of decompressed data packets 212-218. As noted above, the first kernel 116 can be composed of a hierarchy of threads, wherein a thread can execute over a respective compressed data packet. For purposes of explanation, the first kernel 116 (and other kernels described herein) is described as being composed of a single thread that is executed in parallel by several cores (e.g., and possibly several multi-processors); it is to be understood, however, that the first kernel 116 (and other kernels) can be composed of multiple different threads that are assigned to be executed in parallel across several multi-processors of the GPU 106.

As shown, a first thread executes over a first compressed data packet 204. The first thread locates the ID corresponding to the first compressed data block therein, and decompresses the first compressed block using the approach identified in the ID. Subsequently, the first thread can locate the ID corresponding to the second compressed block in the first compressed data packet 204, and decompresses the second compressed block using the approach identified in the ID corresponding to the second compressed block. This process continues until all compressed blocks in the first compressed data packet 204 are decompressed, thereby creating a first decompressed data packet 212. As shown, the decompressed data packets 212-218 comprise a respective plurality of decompressed data elements (e.g., data corresponding to individual pixels). The plurality of threads (instances of the thread of the first kernel 116) execute in parallel over the plurality of compressed data packets 204-210 in the chunk 202, such that the plurality of decompressed data packets 212-218 are generated in parallel.

FIG. 3 illustrates execution of the second kernel in the plurality of kernels 116-118 over a decompressed data packet in the plurality of decompressed data packets 212-218 output by the first kernel. As indicated above, each decompressed data packet can comprise symbols that correspond to data in the original data packet (e.g., the original data has been "mapped" to symbols). Moreover, in an example, pixels in the original data can be correlated with one another to identify relative positions. The second kernel can be configured to receive a decompressed data packet output by the first kernel 116 and de-map and correlate decompressed data elements in the decompressed data packet. In an exemplary embodiment, decompressed data packets must be received in a particular sequence. For example, data in the first decompressed data packet 212 may include reference data for the second decompressed data packet 214. It can therefore be ascertained that data elements in the second decompressed data packet 214 cannot be de-mapped and correlated until reference data in the first decompressed data packet 212 is obtained (e.g., until data elements in the first decompressed data packet 212 are correlated and de-mapped).

To exploit the parallel processing capabilities of the GPU 106, instances of a thread of the second kernel can be executed in parallel over respective decompressed data elements in each decompressed data packet. Thus, for instance, the first decompressed data packet 212 can be received, which can comprise data pertaining to 4,096 pixels. 4,096 instances of the thread of the second kernel can be executed in parallel over the data pertaining to the 4,096 pixels, thereby correlating and de-mapping the pixel data. Thus, the number of instances of the thread of the second kernel executed in parallel by the GPU 106 can be equivalent to the number of decompressed data elements in the decompressed data packets. A resultant data packet 302 is a de-mapped, correlated data packet (referred to as a de-mapped data packet), which should be equivalent to the original image packet. Subsequently, the second decompressed data packet 214 is received, and the instances of the thread of the second kernel are again executed in parallel over the pixel data therein. This process continues until the first kernel 116 ceases to receive chunks of data packets and thus ceases to output decompressed data packets. Further, it is to be understood that in some situations decompressed data packets can be received in parallel, such that multiple sets of threads execute over pixel data in multiple respective decompressed data packets in parallel.

FIG. 4 illustrates execution of the third kernel in the plurality of kernels 116-118 over de-mapped data packets 402-408. As noted above, the third kernel is configured to compute a respective checksum for each de-mapped data packet in the plurality of de-mapped data packets 402-408. Thus, threads can be executed in parallel over respective de-mapped data packets, and checksums 410-416 can be appended to the de-mapped data packets 402-408.

In an example, prior to original image packets being compressed, checksums for respective image packets can be computed. Such checksums may then be transmitted separately (optionally compressed) or embedded in compressed data packets. The checksums 410-416 can then be compared with the checksums computed prior to compression to ensure that the original image data has been recovered.

For example, if the embedded checksum 410 of the first de-mapped data packet 402 fails to match a checksum corresponding to the de-mapped data packet 402 computed prior to compression, it can be determined that the de-mapped data packet 402 was damaged and/or modified during at least one of compression, transmission, or decompression. In such an event, redelivery of the corresponding compressed data packet, chunk, etc. can be requested, and/or the de-mapped data packet can be identified as deficient.

Figure 5:
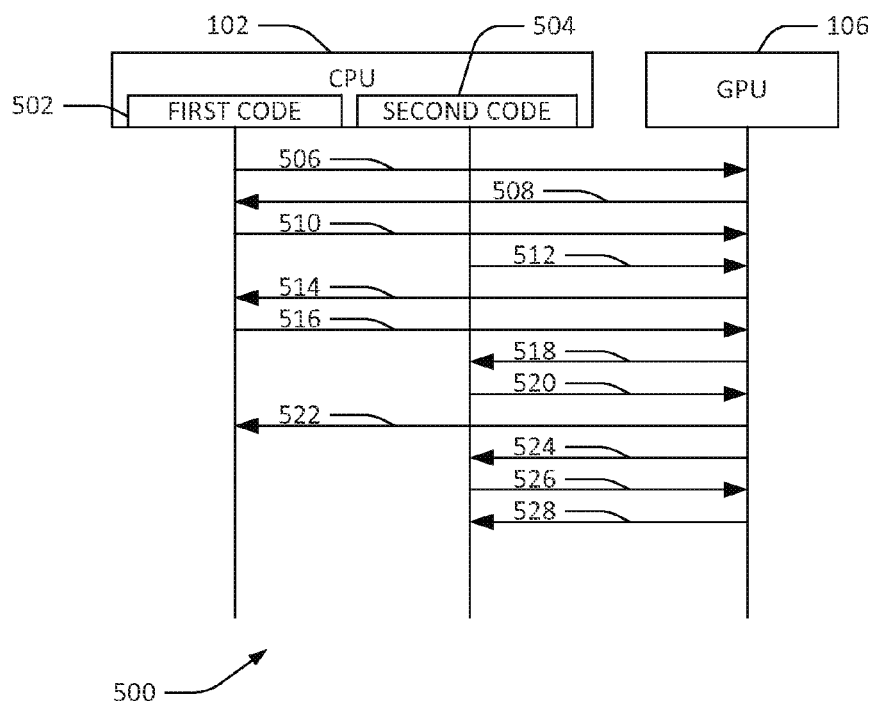
FIG. 5 is an exemplary communications flow diagram illustrating transmittal of signals between a central processing unit (CPU) and a GPU.

FIG. 5 is a communications flow diagram 500 that illustrates exemplary communications between the CPU 102 and the GPU 106. In the exemplary diagram 500, the CPU 102 executes first code 502 and second code 504 in connection with directing operation of the GPU 106. As discussed above, the CPU 102 is configured to direct transfer of chunks from the system memory 104 to the onboard memory 110 of the GPU 106. The CPU 102 can be further configured to direct execution of the plurality of kernels 116-118 (e.g., transmit command signals that respectively indicate when such kernels are to be executed). In an exemplary embodiment, the CPU 102 can execute a single portion of code to direct such operations. However, in such an embodiment, the GPU 106 may be idle or not fully employed at various stages of decompression. For example, while the single portion of code executing on the CPU 102 awaits a chunk to be loaded into the onboard memory 110, multi-processors on the GPU 106 may be idle. Similarly, while the GPU 106 is decompressing a chunk of compressed data packets, a next chunk would not begin being transferred into the onboard memory 110 until the chunk being decompressed by the GPU 106 is output thereby.

Thus, the CPU 102 can execute the first code 502 and the second code 504, wherein the first code 502 and the second code 504 are configured to operate in conjunction to facilitate exploiting parallel processing capabilities of the GPU 106. The processor 102 ascertains when a first chunk of compressed data packets (e.g., from a stream of compressed data packets) has been received and resides in the system memory 104. Responsive to detecting that the system memory 104 comprises the first chunk of compressed data packets, the first code 502 causes a command signal to be transmitted to the GPU 106 at 506, wherein the command signal causes the GPU 106 to retrieve the first chunk from the system memory 104 and load the first chunk into the onboard memory 110 of the GPU 106. Responsive to loading the first chunk into the onboard memory 110, the GPU 106 can transmit a signal to the CPU 102 at 508 that is received by the first code 502, wherein the signal indicates that the chunk has been loaded into the onboard memory 110.

Responsive to receiving the signal from the GPU 106, the first code 502 can cause a command signal to be transmitted to the GPU 106 at 510 that causes the GPU 106 to decompress the first chunk of data in the onboard memory 110. As the GPU 106 begins to decompress the first chunk of data in the onboard memory 110, the second code 504 of the CPU 102 can ascertain that a second chunk of compressed data packets is available in the system memory 104, and can cause a command signal to be transmitted to the GPU 106 at 512 that causes the GPU 106 to retrieve the second chunk from the system memory 104 and load such second chunk into the onboard memory 110 of the GPU 106.

In an exemplary embodiment, the onboard memory 110 can have sufficient capacity to retain multiple chunks, such that the transmittal of the command signals at 506 and 512 can occur proximate in time. In another exemplary embodiment, the second code 504 can cause the second chunk to be placed in a buffer, such that the second chunk can be retrieved more quickly by the GPU 106.

When the GPU 106 decompresses the data packets in the first chunk, the GPU 106 can transmit an indication to the CPU 102 at 514 that informs the first code 502 that the GPU 106 has decompressed the data packets in the first chunk. Responsive to receiving such indication, the first code 502 can cause a command signal to be transmitted to the GPU at 516 that causes the GPU 106 to transmit a first decompressed chunk of data packets to an off-board memory. Responsive to loading the second chunk into the onboard memory 110, the GPU 106 can transmit a signal to the CPU 102 at 518 that is received by the second code 504, wherein the signal indicates that the second chunk has been loaded into the onboard memory 110. At 520, responsive to receiving the signal from the GPU 106 that indicates that the second chunk has been loaded into the onboard memory 110, the second code 504 causes a command signal to be transmitted to the GPU 106 that causes the GPU 106 to begin decompressing the second chunk.

The GPU 106, at 522, transmits an indication that is received by the first code 502 that the first chunk has been decompressed and transmitted to the off-board memory. Subsequently, the first code 502 can cause a command signal to be transmitted to the GPU 106 that causes the GPU 106 to retrieve a third chunk—that is, acts 506, 508, 510, 514, 516, and 522 can be repeated.

At 524, when the GPU 106 decompresses the data packets in the second chunk, the GPU 106 can transmit an indication to the CPU 102 that informs the second code 502 that the GPU 106 has decompressed the data packets in the second chunk. Responsive to receiving such indication, the second code 504 can cause a command signal to be transmitted to the GPU at 526 that causes the GPU 106 to transmit a second decompressed chunk of data packets to the off-board memory. At 528, the GPU 106 can transmit a signal to the CPU 102 that is received by the second code 504, indicating that the second decompressed chunk of data packets has been transmitted to the off-board memory. Subsequently, the second code 504 can cause a command signal to be transmitted to the GPU 106 that causes the GPU 106 to retrieve a fourth chunk—that is, acts 512, 518, 520, 524, 526, and 528 can be repeated.

It is to be ascertained that the acts 506-528 need not occur in the sequence shown. Rather, the communications flow diagram 500 is set forth to indicate that multiple portions of code can be executed by the CPU 102 to efficiently utilize the resources of the GPU 106, such that the GPU 106 is not idle when a chunk of compressed data packets is ready to be decompressed. For example, act 512 may occur prior to act 508, prior to act 510, after act 514, or after act 516. Further, while FIG. 5 illustrates the CPU 102 as executing two portions of code when interacting with the GPU 106, it is contemplated that the CPU 102 may execute more than two portions of code.

Moreover, the first code 502 and the second code 504 executed by the CPU 502 can act as respective separate data processing pipelines, and thus have respective independent contexts with the GPU 106. Thus, the first code 502 and the second code 506 can each be configured to initialize the GPU 106. Further, the first code 502 can be allocated resources that are independent from resources allocated to the second code 504.

Figure 6:
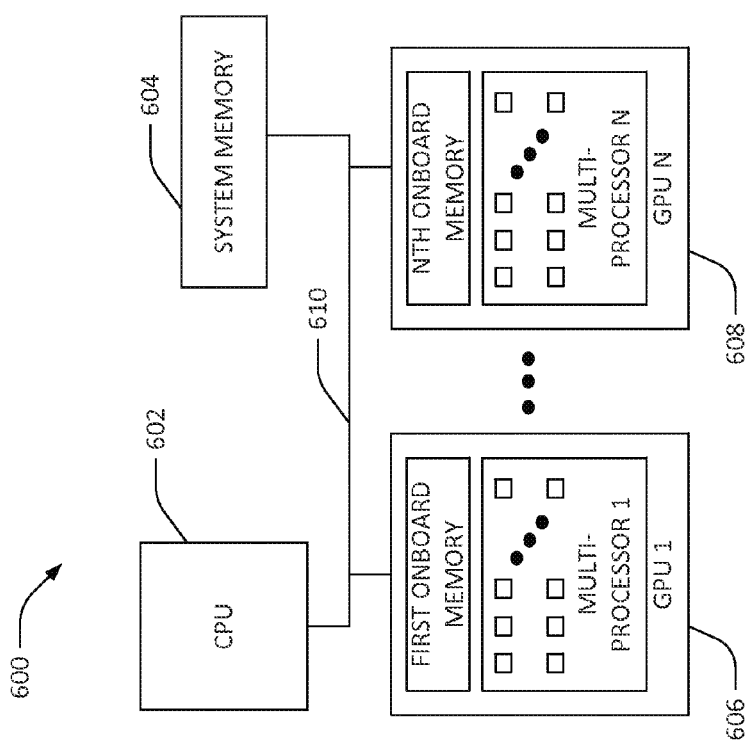
FIG. 6 is a functional block diagram of an exemplary system that facilitates decompressing data through utilization of a plurality of GPUs.

Referring now to FIG. 6, an exemplary system 600 that facilitates data decompression using multiple GPUs is illustrated. The system 600 comprises a CPU 602, a system memory 604, and a plurality of GPUs 606-608 in communication with one another via a system bus 610. The CPU 602 can execute a plurality of portions of code, each of which act as a respective independent data processing pipeline. The CPU 602 can thus control operation of the GPUs 606-608 by executing portions of code that respective correspond to the GPUs 606-608.

For example, a first portion of code executing on the CPU 602 can initialize and direct the operation of the first GPU 606, and an Nth portion of code executing on the CPU 602 can initialize and direct the operation of the Nth GPU 608. In another example, the CPU 602 can execute a respective plurality of portions of code for each GPU in the plurality of GPUs 606-608. For example, a first portion of code and a second portion of code, when executed by the CPU 602, can each initialize the first GPU 606 and direct operation of the first GPU 606 in tandem. Similarly, a Jth and Kth portion of code, when executed by the CPU 602, can each initialize the Nth GPU 608 and direct operation of the Nth GPU 608 in tandem. Each GPU in the GPUs 606-608 can act independently of other GPUs in the system 600, and thus operate similar to the manner described above. By incorporating additional GPUs into the system 600, the rate of decompression can be further increased.

The rate of decompression, however may be limited by other factors. For example, the system bus 610 may have a finite transfer bandwidth, and may not be able to support transferring chunks between the system memory 604 and the plurality of GPUs 606-608 without introducing some latency and/or without requiring buffering. Additionally, CPUs generally are able to execute a limited number of portions of code, which can thus limit the number of GPUs in the plurality of GPUs 606-608, although it is contemplated that the CPU 602 may comprise multiple CPUs or may be a distributed CPU.

It is also contemplated that a single stream of encoded packets can be divided amongst a plurality of computing devices for decompression, or that a device, such as a satellite, can divide data to be transmitted into a plurality of streams to be decompressed by a plurality of computing devices.

Figure 7:
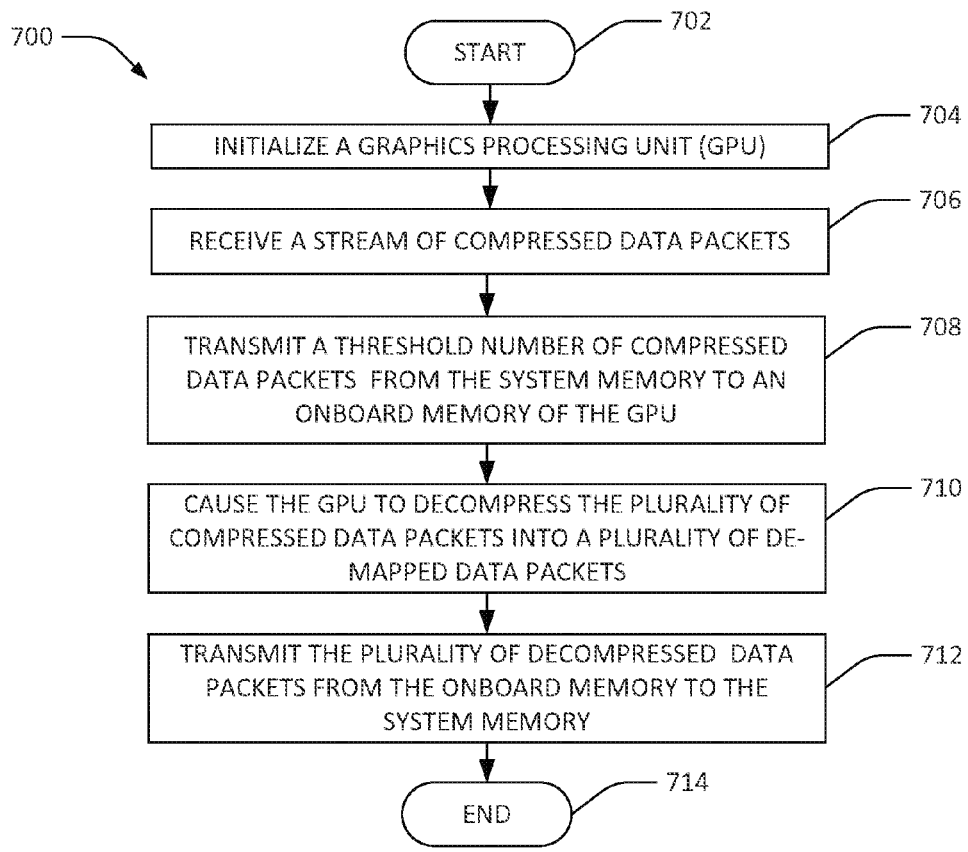
FIG. 7 is a flow diagram that illustrates an exemplary methodology for decompressing a stream of compressed data packets.
Figure 8:
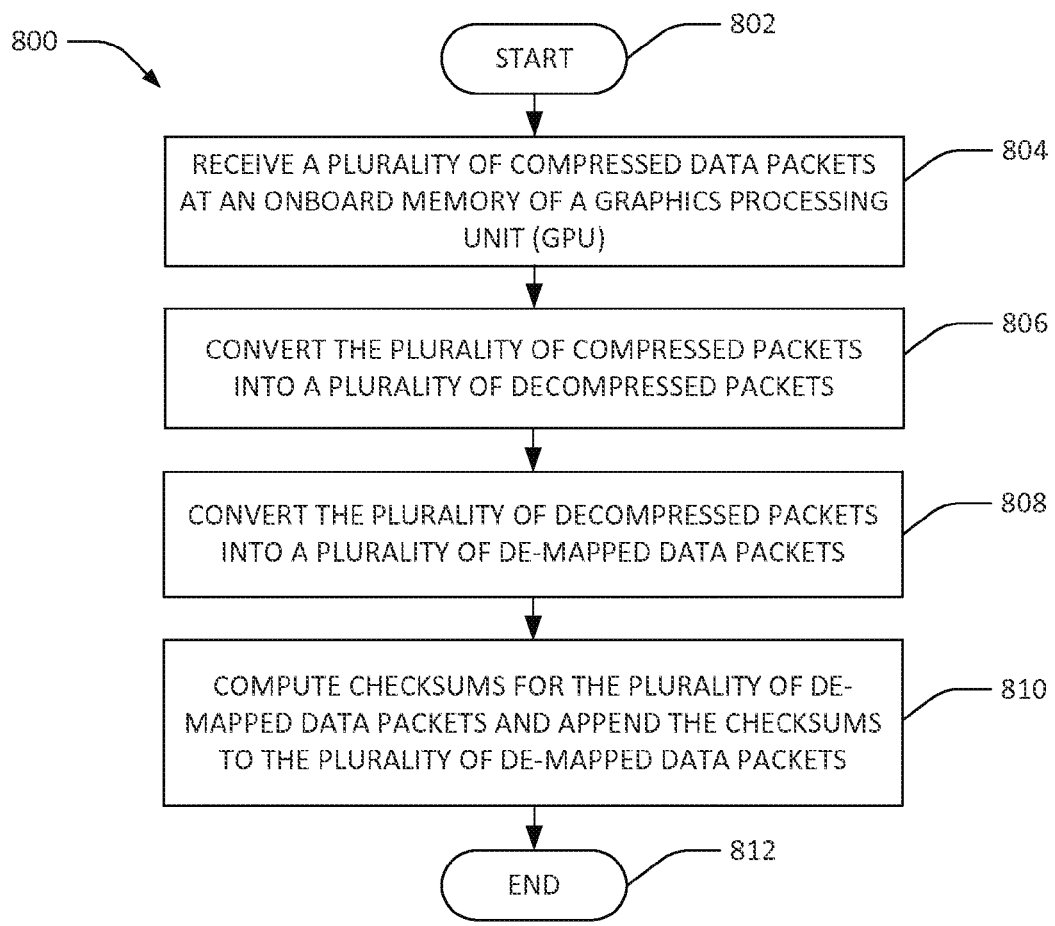
FIG. 8 is a flow diagram that illustrates an exemplary methodology for decompressing a plurality of decompressed data packets through utilization of a GPU.

FIGS. 7 and 8 illustrate exemplary methodologies relating to data decompression using a GPU. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 7, an exemplary methodology 700 that facilitates decompressing data with a GPU is illustrated. The methodology 700 begins at 702, and at 704 the GPU is initialized. At 706, a stream of compressed packets is received, and compressed packets from the stream are stored in a system memory. At 708, a threshold number of compressed packets is transmitted from the system memory to an onboard memory of the GPU. At 710, the GPU decompresses the plurality of compressed packets, thereby creating a plurality of decompressed packets. Decompressing the compressed packets can include de-mapping and correlating data elements that have been subjected to de-correlation and mapping. At 712, the plurality of decompressed packets are transmitted from the onboard memory to the system memory. The methodology 700 can be repeated as additional chunks of compressed data packets are received. The methodology 700 completes at 714.

Referring now to FIG. 8, an exemplary methodology 800 that facilitates decompressing a plurality of compressed packets into a plurality of de-mapped data packets is illustrated. The methodology 800 begins at 802, and at 804, a plurality of compressed data packets is received at an onboard memory of a GPU. As described above, original image packets can be subjected to entropy encoding as well as Rice compression—thus, the compressed data packets are both encoded and compressed. At 806, a first kernel is executed on the GPU, which converts the plurality of compressed data packets into a respective plurality of decompressed data packets in parallel. For instance, the first kernel can execute a respective processing thread of the GPU over each compressed packet in the plurality of compressed packets to decompress the plurality of compressed packets in parallel. In an embodiment, the compressed packets are compressed by way of a Rice compression algorithm, and the first kernel executes a Rice decompression algorithm over the plurality of compressed packets.

At 808, a second kernel executed by the GPU causes the GPU to convert the plurality of decompressed data packets into a plurality of de-mapped data packets. Sequentially, one decompressed data packet at a time, a respective processing thread of the second kernel can be executed over each mapped (de-correlated) data element in a respective plurality of mapped data elements comprised by each decompressed data packet. The respective processing thread de-maps a mapped data element and correlates the de-mapped data element with reference data in order to form a respective plurality of de-mapped, correlated data elements, which can be concatenated to form de-mapped data packets.

At 810, a third kernel executed by the GPU causes the GPU to compute respective checksums for the de-mapped data packets in parallel. A respective processing thread of the third kernel can be executed over each de-mapped data packet in the plurality of de-mapped data packets in order to compute a respective checksum for each de-mapped data packet. Such checksums can be compared with previously computed checksums to verify the integrity and accuracy of the de-mapped data packets, whereby defective packets can be identified and re-requested. The methodology 800 ends at 812.

Figure 9:
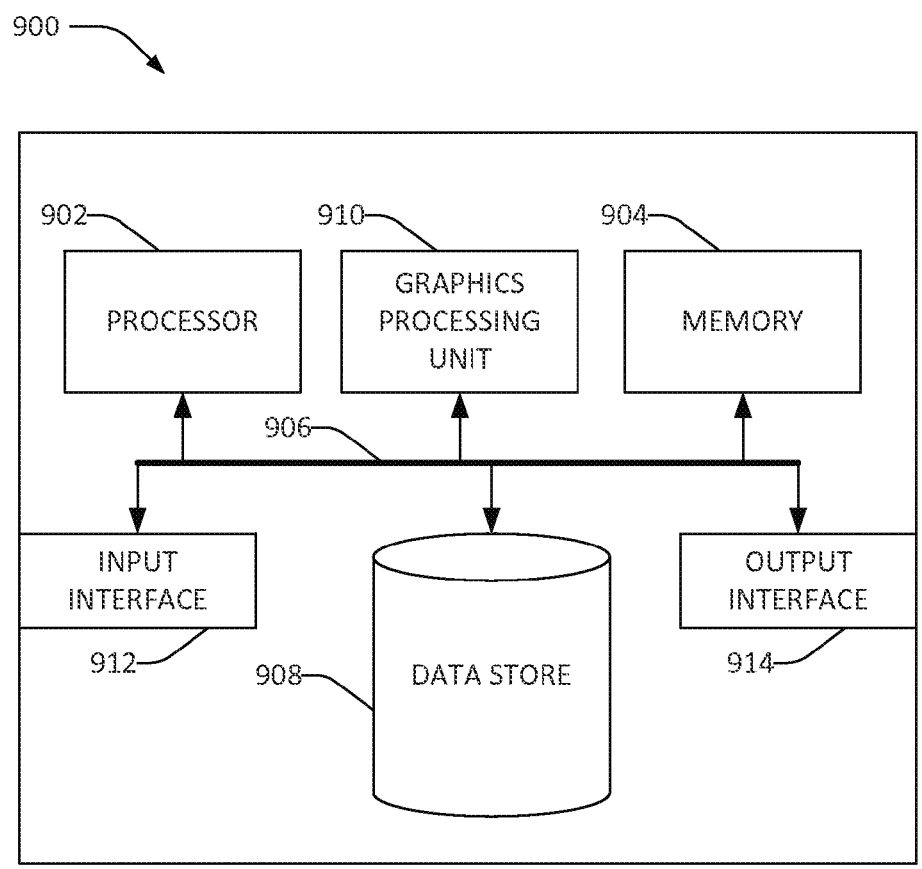
FIG. 9 is an exemplary computing device.

Referring now to FIG. 9, a high-level illustration of an exemplary computing device 900 that can be used in accordance with the systems and methodologies disclosed herein is illustrated. For instance, the computing device 900 may be used in a system that receives and decompresses a stream of compressed packets. By way of another example, the computing device 900 can be used in a system that uses a GPU to decompress encoded packets in parallel. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store encoded packets received from a stream of encoded packets, checksums, decoding and correlating instructions, reference data, decompressed packets, or other data.

The computing device 900 additionally includes a data store 908 that is accessible by the processor 902 by way of the system bus 906. The data store 908 may include executable instructions, decompressed packets, reference data, etc. The computing device 900 additionally includes at least one graphics processing unit 910 that executes instructions stored in the memory 904 and/or instructions stored in an onboard memory of the graphics processing unit 910. The instructions may be, for instance, instructions for implementing functionality described as being carried out by one or more components discussed above or instructions for implementing one or more of the methods described above. For example, the graphics processor 910 may execute one or more kernels that can be used to decompress compressed packets of data. The graphics processing unit 910 may access the memory 904 by way of the system bus 906.

The computing device 900 also includes an input interface 912 that allows external devices to communicate with the computing device 900. For instance, the input interface 912 may be used to receive instructions from an external computer device, from a user, etc. The computing device 900 also includes an output interface 914 that interfaces the computing device 900 with one or more external devices. For example, the computing device 900 may display text, images, etc. by way of the output interface 914.

It is contemplated that the external devices that communicate with the computing device 900 via the input interface 912 and the output interface 914 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 900 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. It should also be appreciated that reference throughout this specification to "one embodiment", "an embodiment", "one or more embodiments", or "different embodiments", for example, means that a particular feature may be included in the practice of the invention.

Similarly, it should be appreciated that in the description various features are sometimes grouped together in a single embodiment, figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A graphics processing unit (GPU) comprising a plurality of cores, the GPU programmed with instructions that, when executed by the GPU, cause the GPU to perform acts, comprising:
   receiving a plurality of compressed data packets, the plurality of compressed data packets compressed by way of a lossless compression algorithm;
   decompressing the plurality of compressed data packets to generate a plurality of de-mapped data packets,
      wherein the instructions comprise a first kernel that comprises a first thread, instances of the first thread executed in parallel by multiple cores of the GPU, wherein decompressing the plurality of compressed data packets comprises executing the instances of the first thread in parallel over data packets in the plurality of compressed data packets to generate a plurality of decompressed data packets, each decompressed data packet comprising a respective plurality of decompressed data elements,
      wherein the instructions comprise a second kernel that comprises a second thread, instances of the second thread executed in parallel by multiple cores of the GPU, wherein decompressing the plurality of compressed data packets comprises executing the instances of the second thread in parallel over decompressed data elements of a decompressed data packet to generate a de-mapped data packet, and
      wherein the instructions comprise a third kernel that comprises a third thread, instances the third thread executed in parallel by multiple cores of the GPU, the acts further comprising executing the instances of the third thread in parallel over de-mapped data packets to compute respective checksums for the de-mapped data packets;
   comparing a checksum computed for a de-mapped data packet with a checksum computed for the de-mapped data packet prior to being subjected to the lossless compression algorithm; and
   outputting a signal responsive to the comparing that is indicative of whether or not the checksum computed for the de-mapped data packet is equivalent to the checksum computed for the de-mapped data packet prior to being subjected to the lossless compression algorithm.

2. The GPU of claim 1, wherein the compressed data packets comprise compressed image packets.

3. The GPU of claim 1, wherein the lossless compression algorithm is a Rice compression algorithm.

4. The GPU of claim 1, the compressed data packets arranged in a sequence, wherein the second kernel, when executed by the GPU, causes the instances of the second thread to execute over the compressed data packets in an order of the sequence, thereby generating the plurality of de-mapped data packets.

5. The GPU of claim 1, wherein each de-mapped data packet comprises a 64×64 pixel image.

6. The GPU of claim 1, the acts further comprising:
receiving a first command signal from a central processing unit (CPU) that is in communication with the GPU; and
responsive to receiving the first command signal, retrieving the plurality of compressed data packets from a system memory and loading the plurality of compressed data packets into an onboard memory of the GPU.

7. The GPU of claim 6, the acts further comprising:
receiving a second command signal from the CPU; and
decompressing the plurality of compressed data packets responsive to receiving the second command signal.

8. The GPU of claim 1, wherein the GPU decompresses the compressed data packets at a rate between 300 MB/s and 1,000 MB/s.

\* \* \* \* \*